(12) United States Patent
Harata

(10) Patent No.: US 10,135,067 B2
(45) Date of Patent: Nov. 20, 2018

(54) MSIX-CONTAINING SILICON MATERIAL (M IS AT LEAST ONE ELEMENT SELECTED FROM GROUP 3 TO 9 ELEMENTS. ⅓<=X<=3) AND METHOD FOR PRODUCING SAME

(71) Applicant: KABUSHIKI KAISHA TOYOTA JIDOSHOKKI, Kariya-shi, Aichi (JP)

(72) Inventor: Masanori Harata, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/511,746

(22) PCT Filed: Sep. 4, 2015

(86) PCT No.: PCT/JP2015/004505
§ 371 (c)(1),
(2) Date: Mar. 16, 2017

(87) PCT Pub. No.: WO2016/042728
PCT Pub. Date: Mar. 24, 2016

(65) Prior Publication Data
US 2017/0309901 A1 Oct. 26, 2017

(30) Foreign Application Priority Data
Sep. 19, 2014 (JP) ................................. 2014-190843

(51) Int. Cl.
| | |
|---|---|
| H01M 4/00 | (2006.01) |
| H01M 4/38 | (2006.01) |
| C01B 33/06 | (2006.01) |
| C08K 3/34 | (2006.01) |
| C08K 7/10 | (2006.01) |

(Continued)

(52) U.S. Cl.
CPC ............ *H01M 4/386* (2013.01); *C01B 33/06* (2013.01); *C08K 3/34* (2013.01); *C08K 7/10* (2013.01); *H01G 11/38* (2013.01); *H01G 11/50* (2013.01); *H01M 4/38* (2013.01);
(Continued)

(58) Field of Classification Search
CPC .... H01M 4/386; H01M 4/38; H01M 10/0525; H01M 2004/027
See application file for complete search history.

(56) References Cited

U.S. PATENT DOCUMENTS

| | | | | |
|---|---|---|---|---|
| 4,923,829 | A | * 5/1990 | Yasutomi | ............ C04B 35/5607 501/154 |
| 2012/0058341 | A1 | 3/2012 | Itahara et al. | |
| 2015/0307362 | A1 | 10/2015 | Sugiyama et al. | |

FOREIGN PATENT DOCUMENTS

| | | |
|---|---|---|
| JP | 2009-517850 A | 4/2009 |
| JP | 2011-090806 A | 5/2011 |

(Continued)

OTHER PUBLICATIONS

H. D. Fuchs et al., "Porous silicon and siloxene: Vibrational and structural properties", Physical Review B, Sep. 15, 1993, pp. 8172-8189, vol. 48, No. 11.

(Continued)

*Primary Examiner* — Jane J Rhee
(74) *Attorney, Agent, or Firm* — Sughrue Mion, PLLC

(57) ABSTRACT

A novel silicon material is provided.
An MSix-containing silicon material contains MSix (M is at least one element selected from the group 3 to 9 elements. $1/3 \leq x \leq 3$) in a silicon matrix.

9 Claims, 9 Drawing Sheets

(51) Int. Cl.
   *H01G 11/38*    (2013.01)
   *H01G 11/50*    (2013.01)
   *H01M 10/0525*  (2010.01)
   *H01M 4/02*     (2006.01)

(52) U.S. Cl.
   CPC ... *H01M 10/0525* (2013.01); *C08K 2201/001* (2013.01); *H01M 2004/027* (2013.01)

(56) References Cited

FOREIGN PATENT DOCUMENTS

| | | |
|---|---|---|
| JP | 2012-072046 A | 4/2012 |
| JP | 2014-107132 A | 6/2014 |
| JP | 2015-224164 A | 12/2015 |
| WO | 2007/064531 A1 | 6/2007 |
| WO | 2014/080608 A1 | 5/2014 |

OTHER PUBLICATIONS

International Search Report of PCT/JP2015/004505 dated Oct. 13, 2015 [PCT/ISA/210].
Written Opinion of PCT/JP2015/004505 dated Oct. 13, 2015 [PCT/ISA/237].

* cited by examiner

MSIX-CONTAINING SILICON MATERIAL (M IS AT LEAST ONE ELEMENT SELECTED FROM GROUP 3 TO 9 ELEMENTS. 1/3<=X<=3) AND METHOD FOR PRODUCING SAME

CROSS REFERENCE TO RELATED APPLICATIONS

This application is a National Stage of International Application No. PCT/JP2015/004505, filed Sep. 4, 2015, claiming priority based on Japanese Patent Application No. 2014-190843, filed Sep. 19, 2014, the contents of all of which are incorporated herein by reference in their entirety.

TECHNICAL FIELD

The present invention relates to an MSix-containing silicon material (M is at least one element selected from the group 3 to 9 elements. $1/3 \leq x \leq 3$) and a method for producing the MSix-containing silicon material.

BACKGROUND ART

Silicon materials are known to be used as components of a semiconductor, a solar battery, a secondary battery, and the like, and research has been actively conducted for silicon materials in recent years.

For example, Non-Patent Literature 1 discloses that $CaSi_2$ is reacted with an acid to synthesize a layered polysilane.

Patent Literature 1 discloses that $CaSi_2$ is reacted with an acid to synthesize a layered polysilane, and also discloses that a lithium ion secondary battery including the layered polysilane as an active material exhibits a suitable capacity.

In addition, Patent Literature 2 discloses an alloy composed of silicon, aluminum, iron, and titanium, and also discloses a lithium ion secondary battery including the alloy as a negative electrode active material.

Patent Literature 3 discloses that $CaSi_2$ is reacted with an acid to synthesize a layered polysilane, and a nano silicon material from which hydrogen is detached is produced by heating the layered polysilane at 300° C. or higher, and that a lithium ion secondary battery including the nano silicon material as an active material exhibits a suitable capacity retention rate.

In addition, in Patent Literature 4, the present inventors have reported that an alloy composed of silicon, calcium, and copper was produced and a silicon material was produced by using the alloy as a raw material.

CITATION LIST

Patent Literature

Patent Literature 1: JP2011-090806 (A)
Patent Literature 2: JP2009-517850 (A)
Patent Literature 3: WO2014/080608 (A1)
Patent Literature 4: JP Patent Application No. 2014-110821

Non-Patent Literature

Non-Patent Literature 1: PHYSICAL REVIEW B, Volume 48, 1993, p. 8172-p. 8189

SUMMARY OF INVENTION

Technical Problem

Research has been intensively conducted for silicon materials as described above, and provision of a novel silicon material has been eagerly desired in the technical fields of semiconductors, solar batteries, secondary batteries, and the like.

The present invention has been made in view of such a situation, and an object of the present invention is to provide a novel silicon material and a method for producing the silicon material.

Solution to Problem

The present inventors have conducted thorough investigation by repeating trials and errors in order to provide a novel silicon material. The present inventors have found that when a molten metal produced by heating Ca, Ti, and Si is cooled, a compound of three components obtained in Patent Literature 4 is not obtained but a compound is obtained in which acicular $TiSi_2$ is dispersed in a $CaSi_2$ matrix. Then, the present inventors have completed the present invention on the basis of this finding.

Specifically, an MSix-containing silicon material (M is at least one element selected from the group 3 to 9 elements. $1/3 \leq x \leq 3$) of the present invention contains MSix in a silicon matrix.

A method for producing an MSix-containing silicon material of the present invention includes:

a molten metal step of heating Ca, M (M is at least one element selected from the group 3 to 9 elements), and Si to form a molten metal;

a step of cooling the molten metal to obtain an MSix-containing calcium silicide containing MSix ($1/3 \leq x \leq 3$) in a calcium silicide matrix;

a step of reacting the MSix-containing calcium silicide with an acid to obtain an MSix-containing polysilane containing the MSix in a polysilane matrix; and a heating step of heating the MSix-containing polysilane at 300° C. or higher.

Advantageous Effects of Invention

The MSix-containing silicon material of the present invention is a suitable silicon material.

DESCRIPTION OF EMBODIMENTS

Figure 1:
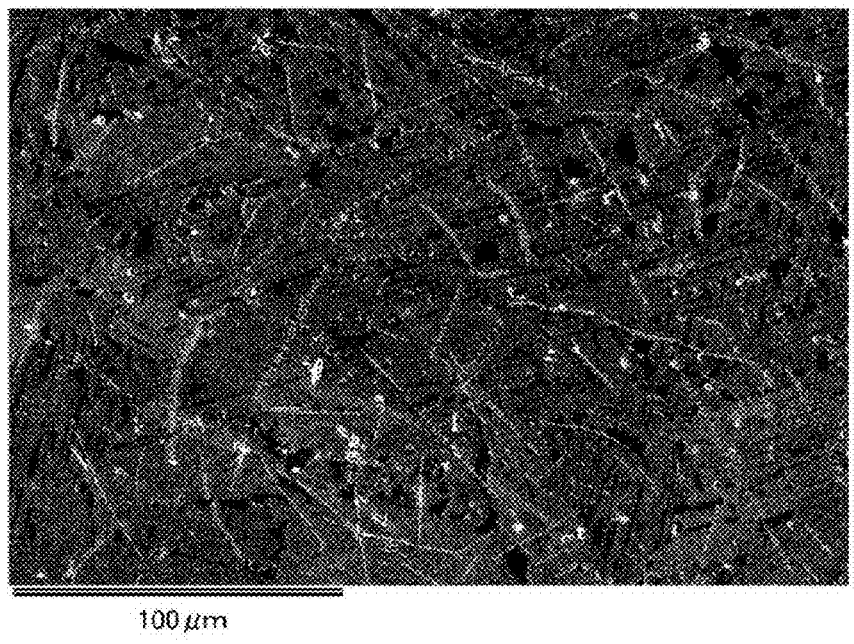
FIG. 1 is a scanning electron microscope image of a cross-section of particles of an MSix-containing calcium silicide of Example 1.

The following describes a best mode for carrying out the present invention. Unless mentioned otherwise, a numerical value range of "x to y" described in the present specification includes, in a range thereof, a lower limit "x" and an upper limit "y". A numerical value range can be formed by arbitrarily combining such upper limit values, lower limit values, and numerical values described in Examples. In addition, numerical values arbitrarily selected within the numerical value range can be used as upper limit and lower limit numerical values.

The MSix-containing silicon material (M is at least one element selected from the group 3 to 9 elements. $1/3 \leq x \leq 3$) of the present invention contains MSix in a silicon matrix.

The method for producing the MSix-containing silicon material of the present invention includes:

a molten metal step of heating Ca, M (M is at least one element selected from the group 3 to 9 elements), and Si to form a molten metal;

a step of cooling the molten metal to obtain an MSix-containing calcium silicide containing MSix ($1/3 \leq x \leq 3$) in a calcium silicide matrix;

a step of reacting the MSix-containing calcium silicide with an acid to obtain an MSix-containing polysilane containing the MSix in a polysilane matrix; and a heating step of heating the MSix-containing polysilane at 300° C. or higher.

The following describes the present invention in accordance with the method for producing the MSix-containing silicon material.

First, the molten metal step of heating Ca, M (M is at least one element selected from the group 3 to 9 elements), and Si to form the molten metal is described. As Ca, M, and Si used in the molten metal step, elemental substances or an alloy of these elements is preferable. Since M is at least one of elements selected from the group 3 to 9 elements in the periodic table, M may be a single element or may be multiple elements among these elements. Ti, Zr, Hf, V, Nb, Ta, Cr, Mo, W, Sc, and Fe are preferable as M. Ca, M, and Si may contain inevitable impurities, another element, and a compound as long as formation of the molten metal of Ca, M, and Si is not inhibited. The usage amounts of Ca, M, and Si may be determined in accordance with the composition ratio of the MSix-containing calcium silicide obtained in the next step.

Ca, M, and Si may be individually melted and then mixed to form the molten metal, two of Ca, M, and Si may be mixed and melted and then the remaining one may be mixed therewith to form the molten metal, or Ca, M, and Si may be mixed and melted. The melting point of Ca is 842° C., the melting point of Si is 1410° C., and the melting point of M is higher than the melting points of Ca and Si. The boiling point of Ca is 1484° C. Thus, in order to suppress scattering of Ca, preferably, Si and M are melted and then Ca is mixed therewith to form the molten metal.

The heating temperature may be any temperature as long as a mixture of Ca, M, and Si can become a molten metal. Here, the molten metal means a liquid-like state of the mixture of Ca, M, and Si. The heating temperature is preferably within the range of 1000° C. to 1800° C., more preferably within the range of 1050° C. to 1500° C., and further preferably within the range of 1100° C. to 1400° C.

In the case of three components, Ca, M, and Si, for example, a molten metal is thought to be generated with the following mechanism.

Si or M is dissolved in molten Ca to form a molten metal.
In molten Ca, Ca diffuses into solid Si or solid M and the melting point of Si or M gradually decreases, so that a molten metal is formed.
Si diffuses in solid M and the melting point of M gradually decreases, so that a molten metal is formed.

Therefore, in the molten metal step, a heating temperature equal to or higher than the melting point of each elemental substance of Ca, M, and Si is considered not to be necessarily needed.

As a heating apparatus for the molten metal step, for example, a high-frequency induction heater, an electric furnace, or a gas furnace may be used. The molten metal step may be performed under a pressurized or pressure-reduced condition, or may be performed in an inert gas atmosphere such as argon.

Next, the step of cooling the molten metal to obtain the MSix-containing calcium silicide containing the MSix in the calcium silicide matrix is described.

Examples of the MSix include $TiSi_2$, $ZrSi_2$, $HfSi_2$, $VSi_2$, $NbSi_2$, $TaSi_2$, $CrSi_2$, $CrSi_{1/3}$, $MoSi_2$, $MoSi_{1/3}$, $MoSi_{3/5}$, $WSi_2$, and $FeSi_2$.

When the molten metal is cooled, first, the MSix having a high melting point becomes deposited, and then layered $CaSi_2$ is formed. The cooling rate is not particularly limited. When the cooling rate is low, the deposited MSix becomes relatively large fibrous particles. When the cooling rate is high, the deposited MSix becomes relatively small particles.

The shape of the MSix in this step is reflected in the shape of the MSix in later polysilane and silicon material. In the case where a later-described silicon material containing the MSix is used as the negative electrode active material of a secondary battery, the MSix is inferred to serve a role of cushioning stress generated by expansion and contraction of silicon, since the MSix has higher strength and a higher Young's modulus than silicon. Thus, the shape of the MSix is considered preferably as a fibrous shape in order to efficiently block stress generated by expansion and contraction of silicon.

Where the fiber length of the fibrous MSix is denoted by c, and the width of the fibrous MSix perpendicular to the fiber length direction is denoted by a when the fibrous MSix is observed with a scanning electron microscope (SEM), $1 < c/a < 1000$ is preferably satisfied, $3 < c/a < 100$ is more preferably satisfied, and $5 < c/a < 50$ is further preferably satisfied. c is preferably within the range of $0 \, \mu m < c < 1000 \, \mu m$, more preferably within the range of $0.01 \, \mu m < c < 500 \, \mu m$, further preferably within the range of 0.1 μm<c<200 μm, and particularly preferably within the range of 1 μm<c<100 μm. A preferable cooling rate for providing a suitable MSix shape is, for example, 100° C./sec to 10000° C./sec.

When the MSix-containing calcium silicide is represented by a composition formula, the composition formula is $Ca_dM_eSi_f$ (0.5≤d≤1, 0<e≤0.5, 1≤f≤3). In the above composition formula, inevitable impurities and the like are not taken into consideration. An ideal composition formula for the MSix-containing calcium silicide satisfies 2×d+x×e=f. However, elemental substance Si may be present in the MSix-containing calcium silicide, and thus the above composition formula is established.

When the value of d is excessively low, a state may not be able to be maintained in which the MSix is present in the layered $CaSi_2$ matrix. When the value of d is excessively high, $Ca_{14}Si_{19}$, which is not layered, is present in the MSix-containing calcium silicide, so that the amount of Ca salts to be removed in the next step becomes very large.

When the value of e is excessively high, a state may not be able to be maintained in which the MSix is present in a fibrous form in the $CaSi_2$ matrix, and in the case where the later-described silicon material containing the MSix is used as the negative electrode active material of a secondary battery, the capacity of the secondary battery may decrease since the MSix itself has weak or no action as an active material.

When the value of f is excessively low, a state may not be able to be maintained in which the MSix is present in the $CaSi_2$ matrix, and in the case where the later-described silicon material containing the MSix is used as the negative electrode active material of a secondary battery, the capacity of the secondary battery decreases. When the value of f is excessively high, the amount of elemental substance Si becomes excessively large, which may have an adverse effect on the stability of the MSix-containing calcium silicide, the reactivity in the next step, or the like.

Examples of preferable ranges of d, e, and f include 0.6≤d≤0.99, 0.7≤d≤0.98, 0.75≤d≤0.97, 0<e≤0.4, 0<e≤0.3, 0<e≤0.25, 1.3≤f≤2.7, 1.5≤f≤2.5, and 1.7≤f≤2.3.

The obtained MSix-containing calcium silicide may be ground and may be further sized.

Next, the step of reacting the MSix-containing calcium silicide with the acid to obtain the MSix-containing polysilane containing the MSix in the polysilane matrix is described. In this step, while Ca in the layered $CaSi_2$ forming the MSix-containing calcium silicide is substituted with H of the acid, Si forms Si—H bonds. The MSix-containing polysilane has a layered shape since a basic structure of a Si layer by $CaSi_2$ of the MSix-containing calcium silicide, which is a raw material, is maintained therein.

Examples of the acid include hydrofluoric acid, hydrochloric acid, hydrobromic acid, hydroiodic acid, sulfuric acid, nitric acid, phosphoric acid, formic acid, acetic acid, methanesulfonic acid, tetrafluoroboric acid, hexafluorophosphoric acid, hexafluoroarsenic acid, fluoroantimonic acid, hexafluorosilicic acid, hexafluorogermanic acid, hexafluorostannic (IV) acid, trifluoroacetic acid, hexafluorotitanic acid, hexafluorozirconic acid, trifluoromethanesulfonic acid, and fluorosulfonic acid. These acids may be used singly or in combination.

In particular, depending on the type of the MSix, an acid that is able to generate a fluorine anion may be preferable as the acid. When this acid is used, Si—O bonds or bonds between Si and the anion of another acid (e.g., Si—Cl bonds in the case of hydrochloric acid) that may be generated in the MSix-containing polysilane decrease. When Si—O bonds or Si—Cl bonds are present in the MSix-containing polysilane, Si—O bonds or Si—Cl bonds may be present in an MSix-containing silicon material even after the next step. In a lithium ion secondary battery in which the MSix-containing silicon material having Si—O bonds or Si—Cl bonds is used as a negative electrode active material, the Si—O bonds or the Si—Cl bonds are inferred to inhibit movement of lithium ions to some extent.

In the step of obtaining the MSix-containing polysilane, the acid is preferably used in an amount larger in mole ratio than that of Ca contained in the MSix-containing calcium silicide. This step may be performed in absence of a solvent, but water is preferably used as a solvent from the standpoint of separation of a target product or removal of by-products such as $CaCl_2$. The reaction condition for this step is preferably a pressure-reduced condition such as a vacuum or an inert gas atmosphere, and is also preferably a temperature condition of being equal to or lower than room temperature, such as an ice bath. The reaction time in this step may be set as appropriate.

When a chemical reaction in the step of obtaining the MSix-containing polysilane in the case where hydrochloric acid is used as the acid is represented by an ideal reaction formula, the reaction formula is as follows. Since the MSix does not change in this step, the MSix is not involved in the following reaction formula.

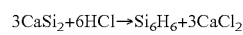
$3CaSi_2+6HCl\rightarrow Si_6H_6+3CaCl_2$

In the above reaction formula, $Si_6H_6$ corresponds to an ideal polysilane.

The step of obtaining the MSix-containing polysilane is preferably performed in presence of water. Since $Si_6H_6$ is able to react with water, normally, a polysilane is not almost obtained as a compound composed of $Si_6H_6$, and is obtained as a compound represented by $Si_6H_s$ $(OH)_tX_u$ (X is a group or an element derived from the anion of the acid, s+t+u=6, 0<s<6, 0<t<6, 0<u<6). Here, inevitable impurities, such as Ca, which may remain in the polysilane are not taken into consideration.

Therefore, when the MSix-containing polysilane is represented by a composition formula, the composition formula is $M_eSi_fH_a(OH)_bX_c$ (X is a group or an element derived from the anion of the acid, 0<e≤0.5, 1≤f≤3, 0<a<f-x×e, 0<b<f-x×e, 0<c<f-x×e, x×e+a+b+c≤f).

When a composition formula of only M and Si in the MSix-containing polysilane is shown for easy understanding, the composition formula is $M_eSi_f$ (0<e≤0.5, 1≤f≤3). Examples of preferable ranges of e and f include 0<e≤0.4, 0<e≤0.3, 0<e≤0.25, 1.3≤f≤2.7, 1.5≤f≤2.5, and 1.7≤f≤2.3.

Next, the heating step of heating the MSix-containing polysilane at 300° C. or higher is described. In this step, the MSix-containing polysilane is heated at 300° C. or higher to detach hydrogen, water, and the like, thereby obtaining the MSix-containing silicon material. When a chemical reaction in this step is represented by an ideal reaction formula, the reaction formula is as follows. Since the MSix does not change also in this step, the MSix is not involved in the following reaction formula.

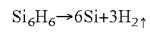
$Si_6H_6\rightarrow 6Si+3H_2\uparrow$

The MSix-containing polysilane that is actually used in the heating step is represented by $M_eSi_fH_a$ $(OH)_bX_c$ (X is a group or an element derived from the anion of the acid, 0<e≤0.5, 1≤f≤3, 0<a<f-x×e, 0<b<f-x×e, 0<c<f-x×e, x×e+ a+b+c≤f), and further contains inevitable impurities. Thus, the actually obtained MSix-containing silicon material is represented by $M_eSi_fH_pO_qX_r$ (X is a group or an element derived from the anion of the acid, $0 \leq e \leq 0.5$, $1 \leq f \leq 3$, $0 \leq p < a$, $0 \leq q < b$, $0 \leq r \leq c$, $x \times e + p + q + r \leq f$, a, b, and c are defined in the composition formula of the MSix-containing polysilane), and further contains inevitable impurities.

In the above composition formula of the MSix-containing silicon material, p is preferably within the range of $0 \leq p < 0.5$, more preferably within the range of $0 \leq p < 0.3$, further preferably within the range of $0 \leq p < 0.1$, and most preferably 0. In the above formula of the MSix-containing silicon material, q is preferably within the range of $0 \leq q < 0.7$, more preferably within the range of $0 \leq q < 0.5$, further preferably within the range of $0 \leq q < 0.3$, and particularly preferably within the range of $0 \leq q \leq 0.2$. In the above formula of the MSix-containing silicon material, r is preferably within the range of $0 \leq r < 0.7$, more preferably within the range of $0 \leq r < 0.5$, further preferably within the range of $0 \leq r < 0.3$, and particularly preferably within the range of $0 \leq r \leq 0.2$.

When a composition formula of only M and Si in the MSix-containing silicon material is shown for easy understanding, the composition formula is $M_e Si_f$ ($0 < e \leq 0.5$, $1 \leq f \leq 3$). Examples of preferable ranges of e and f include $0 < e \leq 0.4$, $0 < e \leq 0.3$, $0 < e \leq 0.25$, $1.3 \leq f \leq 2.7$, $1.5 \leq f \leq 2.5$, and $1.7 \leq f \leq 2.3$.

The heating step is preferably performed in a non-oxidizing atmosphere in which the amount of oxygen is smaller than that in normal atmosphere. Examples of the non-oxidizing atmosphere include a pressure-reduced atmosphere including vacuum, and an inert gas atmosphere. The heating temperature is preferably within the range of 350° C. to 950° C. and more preferably within the range of 400° C. to 800° C. When the heating temperature is excessively low, detachment of hydrogen may be insufficient. When the heating temperature is excessively high, the energy is wasted. The heating time may be set as appropriate in accordance with the heating temperature. The heating time is preferably determined while the mount of hydrogen or the like coming out of the reaction system is measured. By selecting the heating temperature and the heating time as appropriate, the proportion of amorphous silicon and silicon crystallites contained in the produced MSix-containing silicon material and the size of the silicon crystallites are allowed to be adjusted. By selecting the heating temperature and the heating time as appropriate, the shape of a layer having a nano-level thickness and containing amorphous silicon and silicon crystallites contained in the produced MSix-containing silicon material is also allowed to be adjusted.

The size of the silicon crystallites is preferably a nano size. Specifically, the silicon crystallite size is preferably within the range of 0.5 nm to 300 nm, more preferably within the range of 1 nm to 100 nm, further preferably within the range of 1 nm to 50 nm, and particularly preferably within the range of 1 nm to 10 nm. The silicon crystallite size is calculated from Scherrer's equation using the half width of a diffraction peak of the Si(111) plane in an XRD chart obtained by conducting measurement of X-ray diffraction (XRD measurement) on the silicon material.

By the above heating step, an MSix-containing silicon material having a structure in which a plurality of plate-like silicon bodies are laminated in a thickness direction is obtained. In the MSix-containing silicon material, the MSix is present orderly or disorderly. In the case where the MSix is fibrous, the MSix-containing silicon material may be obtained in a state where the fibrous MSix is oriented in such a direction as to intersect a plate-like surface of each plate-like silicon body. Furthermore, the MSix-containing silicon material may be obtained in a state where the fibrous MSix is located over a plurality of layers of the plate-like silicon bodies. Moreover, the MSix-containing silicon material may be obtained in a state where the MSix is dispersedly located therein.

When use of the MSix-containing silicon material as the active material of a secondary battery is taken into consideration, the thickness of each of the plate-like silicon bodies is preferably within the range of 10 nm to 100 nm and more preferably within the range of 20 nm to 50 nm, for efficient insertion and elimination reactions of a charge carrier such as lithium ions. Furthermore, the longitudinal length of each of the plate-like silicon bodies is preferably within the range of the 0.1 μm to 50 μm. In addition, (longitudinal length)/(thickness) of each plate-like silicon body is preferably within the range of 2 to 1000.

Regarding the size of the fibrous MSix in the MSix-containing silicon material, where the fiber length is denoted by c and the width perpendicular to the fiber length direction is denoted by a when the fibrous MSix is observed with a SEM, $1 < c/a < 1000$ is preferably satisfied, $3 < c/a < 100$ is more preferably satisfied, and $5 < c/a < 50$ is further preferably satisfied. c is preferably within the range of $0\ \mu m < c < 1000\ \mu m$, more preferably within the range of $0.01\ \mu m < c < 500\ \mu m$, further preferably within the range of $0.1\ \mu m < c < 200\ \mu m$, and particularly within the range of $1\ \mu m < c < 100\ \mu m$.

The obtained MSix-containing silicon material may be ground and may be further sized. Regarding a preferable particle size distribution of the MSix-containing silicon material measured by a general laser diffraction type particle size distribution measuring device, a mean particle diameter (D50) is, for example, preferably within the range of 1 to 30 μm and more preferably within the range of 1 to 10 μm.

The MSix-containing silicon material of the present invention is usable as the negative electrode active materials of secondary batteries such as lithium ion secondary batteries and electrical storage devices such as electric double layer capacitors and lithium ion capacitors. In addition, the MSix-containing silicon material of the present invention is usable as a material such as for CMOS, semiconductor memories, and solar batteries, a photocatalyst material, etc.

The lithium ion secondary battery of the present invention includes the MSix-containing silicon material as a negative electrode active material. Specifically, the lithium ion secondary battery of the present invention includes a positive electrode, a negative electrode including the MSix-containing silicon material as a negative electrode active material, an electrolytic solution, and a separator.

The positive electrode includes a current collector and a positive electrode active material layer bound on the surface of the current collector.

The current collector refers to an electron conductor that is chemically inert for continuously applying current to the electrode during discharging or charging of the lithium ion secondary battery. Examples of the current collector include at least one selected from silver, copper, gold, aluminum, tungsten, cobalt, zinc, nickel, iron, platinum, tin, indium, titanium, ruthenium, tantalum, chromium, and molybdenum, and metallic materials such as stainless steel. The current collector may be coated with a protective layer known in the art. A current collector whose surface is treated by a method known in the art may be used as the current collector.

The current collector takes forms such as a foil, a sheet, a film, a line shape, a bar shape, and a mesh. Thus, as the current collector, for example, metal foils such as copper foil, nickel foil, aluminum foil, and stainless steel foil may be suitably used. When the current collector is in the form of a foil, a sheet, or a film, the thickness of the current collector is preferably within the range of 1 μm to 100 μm.

The positive electrode active material layer includes a positive electrode active material, and a conductive additive and/or a binding agent if necessary.

Examples of the positive electrode active material include $Li_aNi_bCo_cMn_dD_eO_f$ (0.2≤a≤2, b+c+d+e=1, 0≤e<1, D is at least one element selected from Li, Fe, Cr, Cu, Zn, Ca, Mg, S, Si, Na, K, Al, Zr, Ti, P, Ga, Ge, V, Mo, Nb, W, and La, 1.7≤f≤3) and $Li_2MnO_3$ that are layer compounds. Additional examples of the positive electrode active material include spinel such as $LiMn_2O_4$, a solid solution formed from a mixture of spinel and a layer compound, and polyanion based compound such as $LiMPO_4$, $LiMVO_4$, or $Li_2MSiO_4$ (wherein M is selected from at least one of Co, Ni, Mn, or Fe). Further additional examples of the positive electrode active material include tavorite based compounds represented by $LiMPO_4F$ (M is a transition metal) such as $LiFePO_4F$ and borate based compounds represented by $LiMBO_3$ (M is a transition metal) such as $LiFeBO_3$. Any metal oxide used as the positive electrode active material may have a basic composition of each composition formula described above, and those in which a metal element included in the basic composition is substituted with another metal element may also be used as the positive electrode active material. In addition, as the positive electrode active material, a positive electrode active material substance that does not include a lithium ion contributing to charging and discharging, for example, elemental substance sulfur, a compound that is a composite of sulfur and carbon, metal sulfides such as $TiS_2$, oxides such as $V_2O_3$ and $MnO_2$, polyaniline and anthraquinone and compounds including such aromatics in the chemical structure, conjugate based materials such as conjugate diacetic acid based organic matters, and other materials known in the art, may also be used. Furthermore, a compound having a stable radical such as nitroxide, nitronyl nitroxide, galvinoxyl, and phenoxyl may be used as the positive electrode active material. In the case of using the positive electrode active material substance that does not include lithium, it is necessary to add in advance an ion to the positive electrode and/or the negative electrode by a method known in the art. Here, to add the ion, a metal or a compound containing the ion may be used.

The conductive additive is added for enhancing the conductivity of an electrode. Thus, the conductive additive is preferably added optionally when the conductivity of an electrode is insufficient, and does not have to be added when the conductivity of an electrode is sufficiently superior. The conductive additive may be a chemically inert fine electron conductor, and examples of the conductive additive include carbonaceous fine particles such as carbon black, graphite, acetylene black, Ketchen black®, vapor grown carbon fiber (VGCF), and various metallic particles. One of these conductive additives or a combination of two or more of these conductive additives may be added to the electrode active material layer.

The blending ratio of the conductive additive in the active material layer is preferably active material:conductive additive=1:0.005 to 1:0.5, more preferably 1:0.01 to 1:0.2, and further preferably 1:0.03 to 1:0.1 in mass ratio. The reason is that when the amount of the conductive additive is excessively small, an efficient electrically-conductive path is not formed, and when the amount of the conductive additive is excessively large, moldability of the active material layer worsens and the energy density of the electrode becomes low.

The binding agent serves a role of fastening the active material and the conductive additive to the surface of the current collector to maintain a conductive network in the electrode. Examples of the binding agent include fluorine-containing resins such as polyvinylidene fluoride, polytetrafluoroethylene, and fluororubbers, thermoplastic resins such as polypropylene and polyethylene, imide based resins such as polyimide and polyamide-imide, alkoxysilyl group-containing resins, acrylic resins such as poly(meth)acrylic acid, styrene-butadiene rubber (SBR), carboxymethylcellulose, alginates such as sodium alginate and ammonium alginate, water-soluble cellulose ester crosslinked products, and starch-acrylic acid graft polymers. One or more of these binding agents may be used.

The blending ratio of the binding agent in the active material layer is preferably active material:binding agent=1:0.001 to 1:0.3, more preferably 1:0.005 to 1:0.2, and further preferably 1:0.01 to 1:0.15 in mass ratio. The reason is that when the amount of the binding agent is excessively small, moldability of the electrode deteriorates, and when the amount of the binding agent is excessively large, the energy density of the electrode becomes low.

The negative electrode includes a current collector and a negative electrode active material layer bound on the surface of the current collector. As the current collector, one described for the positive electrode may be used as appropriate. The negative electrode active material layer includes a negative electrode active material, and a conductive additive and/or a binding agent if necessary.

As the negative electrode active material, the MSix-containing silicon material is preferably used, and only the MSix-containing silicon material may be used, or the MSix-containing silicon material and a negative electrode active material known in the art may be used in combination. An MSix-containing silicon material coated with carbon may be used as the negative electrode active material.

As the conductive additive and the binding agent used in the negative electrode, those described for the positive electrode may be used as appropriate in the same blending ratio.

To form the active material layer on the surface of the current collector, the active material may be applied on the surface of the current collector using a conventional method known in the art such as roll coating method, die coating method, dip coating method, doctor blade method, spray coating method, and curtain coating method. Specifically, the active material, a solvent, and, if necessary, the binding agent and/or the conductive additive are mixed to prepare a slurry. Examples of the solvent include N-methyl-2-pyrrolidone, methanol, methyl isobutyl ketone, and water. The slurry is applied on the surface of the current collector and then dried. In order to increase electrode density, compression may be performed after the drying.

The electrolytic solution contains a nonaqueous solvent and an electrolyte dissolved in the nonaqueous solvent.

As the nonaqueous solvent, cyclic esters, linear esters, ethers, and the like may be used. Examples of the cyclic esters include ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. Examples of the linear esters include dimethyl carbonate, diethyl carbonate, dibutyl carbonate, dipropyl carbonate, ethyl methyl carbonate, propionic acid alkyl esters, malonic acid dialkyl esters, and acetic acid alkyl esters. Examples of the ethers include tetrahydrofuran, 2-methyltetrahydrofuran, 1,4-dioxane, 1,2-dimethoxyethane, 1,2-diethoxyethane, and 1,2-dibutoxyethane. As the nonaqueous solvent, a compound in which part or all of hydrogen atoms in the chemical structure of each of the above specific solvents are substituted with fluorine atoms may be used.

Examples of the electrolyte include lithium salts such as $LiClO_4$, $LiAsF_6$, $LiPF_6$, $LiBF_4$, $LiCF_3SO_3$ and $LiN(CP_3SO_2)_2$.

Examples of the electrolytic solution include a solution obtained by dissolving a lithium salt such as $LiClO_4$, $LiPF_6$, $LiBF_4$, or $LiCF_3SO_3$ at a concentration of about 0.5 mol/L to 1.7 mol/L in a nonaqueous solvent such as ethylene carbonate, dimethyl carbonate, propylene carbonate, or diethyl carbonate.

The separator serves to separate the positive electrode and the negative electrode and allow lithium ions to pass therethrough while preventing short circuiting caused due to contact between both electrodes. Examples of the separator include porous materials, nonwoven fabrics, and woven fabrics using one or more types of materials having electrical insulation property such as: synthetic resins such as polytetrafluoroethylene, polypropylene, polyethylene, polyimide, polyamide, polyaramide (aromatic polyamide), polyester, and polyacrylonitrile; polysaccharides such as cellulose and amylose; natural polymers such as fibroin, keratin, lignin, and suberin; and ceramics. In addition, the separator may have a multilayer structure.

Next, a method for producing the lithium ion secondary battery is described.

The positive electrode and the negative electrode are turned into an electrode assembly, interposing the separator between the positive electrode and the negative electrode, if needed. The electrode assembly may be a laminated type obtained by stacking the positive electrode, the separator, and the negative electrode, or a wound type obtained by winding the positive electrode, the separator, and the negative electrode. The lithium ion secondary battery is preferably formed by respectively connecting the current collector of the positive electrode to a positive electrode external terminal and the current collector of the negative electrode to a negative electrode external terminal using current collecting leads or the like, and then adding the electrolytic solution to the electrode assembly. In addition, the lithium ion secondary battery of the present invention preferably executes charging and discharging within a voltage range suitable for the types of the active materials included in the electrodes.

The form of the lithium ion secondary battery of the present invention is not particularly limited, and various forms such as a cylindrical type, a square type, a coin type, and a laminated type, etc., may be used.

The lithium ion secondary battery of the present invention may be mounted on a vehicle. The vehicle may be a vehicle that uses, as all or one portion of the source of power, electrical energy obtained from the lithium ion secondary battery, and examples thereof include electric vehicles and hybrid vehicles. When the lithium ion secondary battery is to be mounted on the vehicle, a plurality of the lithium ion secondary batteries may be connected in series to form an assembled battery. Other than the vehicles, examples of apparatuses equipped with the lithium ion secondary battery include various home appliances, office instruments, and industrial instruments driven by a battery such as personal computers and portable communication devices. In addition, the lithium ion secondary battery of the present invention may be used as power storage devices and power smoothing devices for wind power generation, photovoltaic power generation, hydroelectric power generation, and other power systems, power supply sources for auxiliary machineries and/or power of ships, etc., power supply sources for auxiliary machineries and/or power of aircraft and spacecraft, etc., auxiliary power supply for vehicles that do not use electricity as a source of power, power supply for movable household robots, power supply for system backup, power supply for uninterruptible power supply devices, and power storage devices for temporarily storing power required for charging at charge stations for electric vehicles.

Although the embodiments of the present invention have been described above, the present invention is not limited to the embodiments. Without departing from the gist of the present invention, the present invention can be implemented in various modes with modifications and improvements, etc., that can be made by a person skilled in the art.

EXAMPLES

In the following, the present invention is described more specifically by presenting Examples, Comparative Examples, and the like. The present invention is not limited to the Examples.

Example 1

An MSix-containing calcium silicide, an MSix-containing polysilane, and an MSix-containing silicon material of Example 1 were produced as described below.

Molten Metal Step

Ca, Ti, and Si were weighed out in a carbon crucible in a mole ratio of 0.95:0.05:2, and the crucible was heated at 1150° C. by a high-frequency induction heater in an argon gas atmosphere to make Ca, Ti, and Si into a molten metal.

Step of Obtaining MSix-Containing Calcium Silicide

The molten metal was poured into a predetermined mold and cooled to obtain a $TiSi_2$-containing calcium silicide containing $TiSi_2$ in a calcium silicide matrix. The obtained $TiSi_2$-containing calcium silicide was ground with a mortar and passed through a sieve having a mesh size of 53 μm. The $TiSi_2$-containing calcium silicide passed through the sieve having a mesh size of 53 μm was used as the MSix-containing calcium silicide of Example 1. When the MSix-containing calcium silicide of Example 1 is represented by a composition formula, the composition formula is $Ca_{0.95}Ti_{0.05}Si_2$.

Step of Obtaining MSix-Containing Polysilane

In an argon gas current, 10 g of the MSix-containing calcium silicide of Example 1 was added to 100 mL of a 36 mass % HCl aqueous solution in an ice bath and the mixed solution was stirred for 90 minutes. Dark green powder was confirmed to be dispersed in the reaction solution. The reaction solution was filtered, and the residue was rinsed with distilled water and acetone and further dried under reduced pressure at room temperature for 12 hours or longer to obtain 8 g of a $TiSi_2$-containing polysilane. This was used as the MSix-containing polysilane of Example 1.

Heating Step

Eight grams of the above MSix-containing polysilane of Example 1 was heated at 500° C. in an argon gas atmosphere for 1 hour to obtain the MSix-containing silicon material of Example 1.

Example 2

An MSix-containing calcium silicide, an MSix-containing polysilane, and an MSix-containing silicon material of Example 2 were obtained by the same method as in Example 1 except for using Ca, Ti, and Si in a mole ratio of 0.87:0.13:2 in the molten metal step. When the MSix-containing calcium silicide of Example 2 is represented by a composition formula, the composition formula is $Ca_{0.87}Ti_{0.13}Si_2$.

Example 3

An MSix-containing calcium silicide, an MSix-containing polysilane, and an MSix-containing silicon material of Example 3 were obtained by the same method as in Example 1 except for using Ca, Ti, and Si in a mole ratio of 0.78:0.22:2 in the molten metal step. When the MSix-containing calcium silicide of Example 3 is represented by a composition formula, the composition formula is $Ca_{0.78}Ti_{0.22}Si_2$.

Example 4

An MSix-containing calcium silicide, an MSix-containing polysilane, and an MSix-containing silicon material of Example 4 were obtained by the same method as in Example 1 except for using Ca, Fe, and Si in a mole ratio of 0.95:0.03:2 instead of Ca, Ti, and Si in the molten metal step. When the MSix-containing calcium silicide of Example 4 is represented by a composition formula, the composition formula is $Ca_{0.95}Fe_{0.03}Si_2$.

Example 5

An MSix-containing calcium silicide, an MSix-containing polysilane, and an MSix-containing silicon material of Example 5 were obtained by the same method as in Example 1 except for using Ca, Fe, and Si in a mole ratio of 0.84:0.13:2 instead of Ca, Ti, and Si in the molten metal step. When the MSix-containing calcium silicide of Example 5 is represented by a composition formula, the composition formula is $Ca_{0.84}Fe_{0.13}Si_2$.

Example 6

An MSix-containing calcium silicide, an MSix-containing polysilane, and an MSix-containing silicon material of Example 6 were obtained by the same method as in Example 1 except for using Ca, Fe, and Si in a mole ratio of 0.72:0.22:2 instead of Ca, Ti, and Si in the molten metal step. When the MSix-containing calcium silicide of Example 6 is represented by a composition formula, the composition formula is $Ca_{0.72}Fe_{0.22}Si_2$.

Example 7

Molten Metal Step $CaSi_2$ containing Fe was prepared. Twenty grams of the $CaSi_2$ was put into a carbon crucible. The carbon crucible was placed in a high-frequency induction heater and heated at 1150° C. in an argon gas atmosphere to melt the $CaSi_2$. To the molten $CaSi_2$, 1.5 g of Ca was added to obtain a molten metal.

Step of Obtaining MSix-Containing Calcium Silicide

The molten metal was poured into a predetermined mold and cooled to obtain a FeSix-containing calcium silicide containing FeSix in a calcium silicide matrix. The obtained FeSix-containing calcium silicide was ground with a mortar and passed through a sieve having a mesh size of 53 μm. The FeSix-containing calcium silicide passed through the sieve having a mesh size of 53 μm was used as the MSix-containing calcium silicide of Example 7. When the MSix-containing calcium silicide of Example 7 is represented by a composition formula, the composition formula is $Ca_{0.95}Fe_{0.09}Si_2$.

Subsequently, an MSix-containing polysilane and an MSix-containing silicon material of Example 7 were produced by the same method as in Example 1.

Example 8

An MSix-containing calcium silicide, an MSix-containing polysilane, and an MSix-containing silicon material of Example 8 were obtained by the same method as in Example 7 except for changing the amount of Ca added to 2 g in the molten metal step. When the MSix-containing calcium silicide of Example 8 is represented by a composition formula, the composition formula is $Ca_{1.08}Fe_{0.08}Si_{1.9}$.

An MSix-containing calcium silicide, an MSix-containing polysilane, and an MSix-containing silicon material of Example 9 were obtained by the same method as in Example 1 except for using Ca, Fe, and Si in a mole ratio of 32:6:62 instead of Ca, Ti, and Si in the molten metal step and changing the heating temperature to 900° C. in the heating step. When the MSix-containing calcium silicide of Example 9 is represented by a composition formula, the composition formula is $Ca_{32}Fe_6Si_{64}$, that is, $Ca_1Fe_{0.19}Si_2$.

Comparative Example 1

A calcium silicide, a polysilane, and a silicon material of Comparative Example 1 were obtained by the same method as in Example 1 except for not using Ti and using Ca and Si in a mole ratio of 1:2 in the molten metal step.

Evaluation Example 1

A cross-section of particles of the MSix-containing calcium silicide of Example 1 was observed with a scanning electron microscope (SEM), and analysis was further performed on Ca, Ti, and Si by energy-dispersive X-ray analysis method (EDX). FIG. 1 shows the obtained SEM image. From the results of EDX, in the SEM image in FIG. 1, Si was confirmed to be present in the entirety, the darkest-colored portions were confirmed as elemental substance Si, Ti was confirmed to be present in light-colored fibrous portions, and Ca was confirmed to be present in portions other than the fibrous portions and the darkest-colored portions.

Therefore, the MSix-containing calcium silicide of Example 1 was confirmed to contain fibrous $TiSi_2$ in the calcium silicide matrix.

Figure 2:
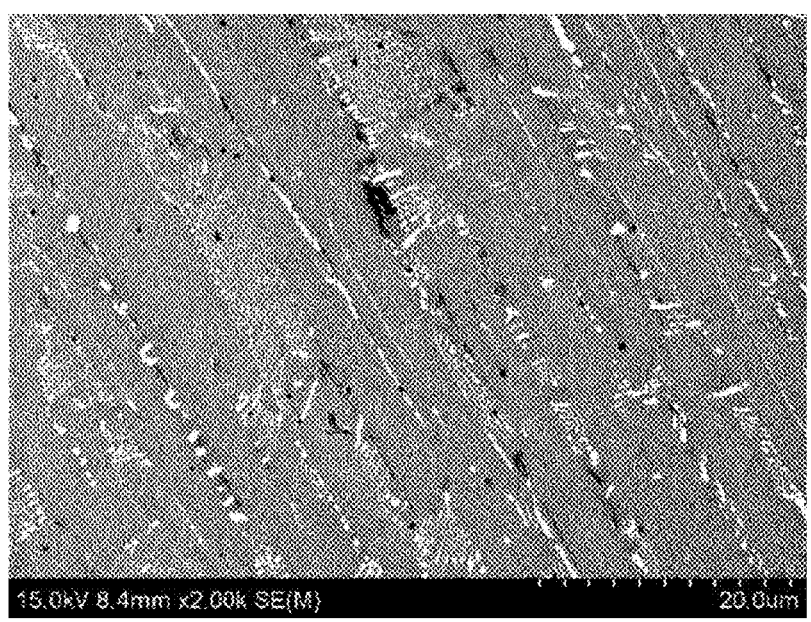
FIG. 2 is a scanning electron microscope image of a cross-section of particles of an MSix-containing calcium silicide of Example 4.
Figure 3:
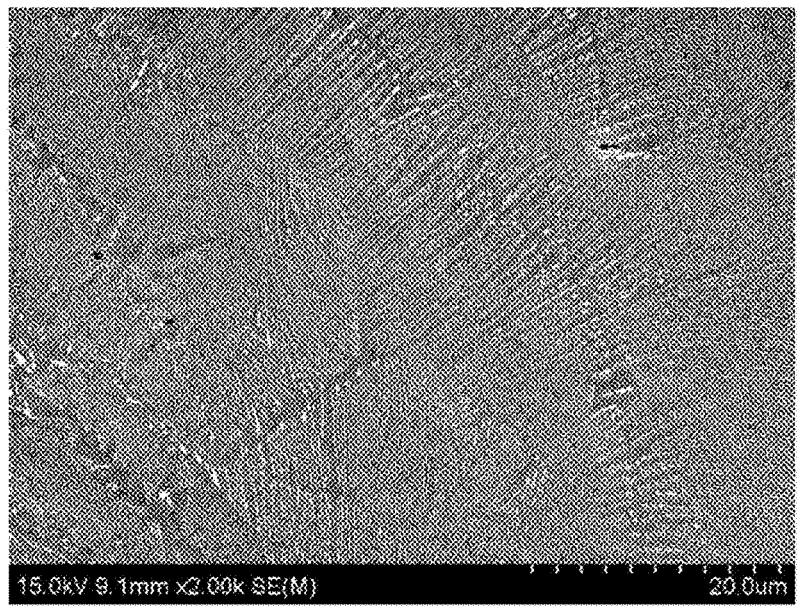
FIG. 3 is a scanning electron microscope image of a cross-section of particles of an MSix-containing calcium silicide of Example 5.
Figure 4:
FIG. 4 is a scanning electron microscope image of a cross-section of particles of an MSix-containing calcium silicide of Example 6.

Similarly, cross-sections of particles of the MSix-containing calcium silicides of Examples 4 to 6 were observed with a SEM, and analysis was further performed on Ca, Fe, and Si by EDX. FIGS. 2 to 4 show the obtained SEM images. From the results of EDX, in the SEM images in FIGS. 2 to 4, Si was confirmed to be present in the entirety, the darkest-colored portions were confirmed as elemental substance Si, Fe was confirmed to be present in white fibrous portions, and Ca was confirmed to be present in portions other than the fibrous and darkest-colored portions.

Therefore, the MSix-containing calcium silicides of Examples 4 to 6 were confirmed to contain fibrous FeSi and $FeSi_2$ in the calcium silicide matrix.

Evaluation Example 2

Figure 5:
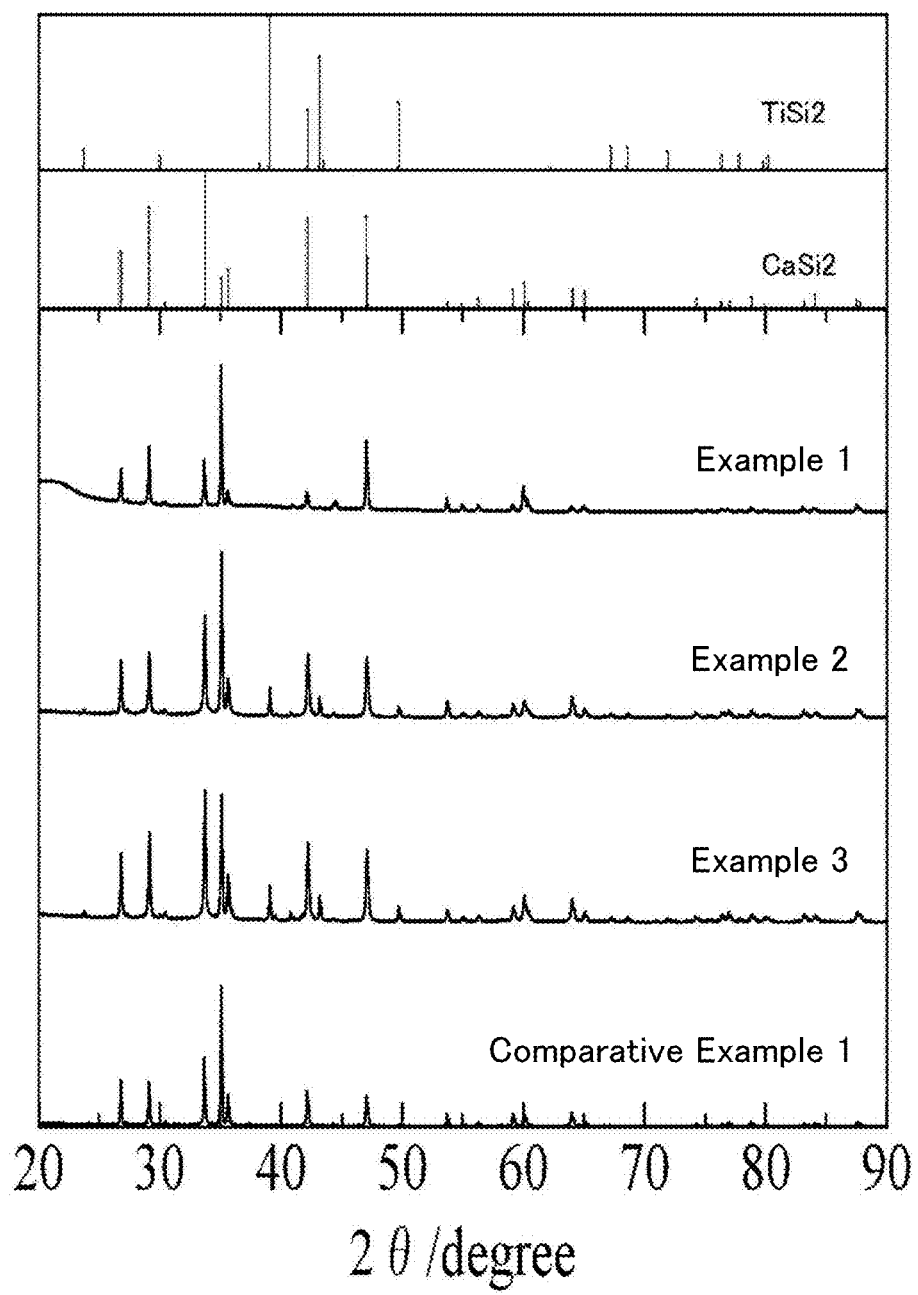
FIG. 5 shows X-ray diffraction charts of MSix-containing calcium silicides of Examples 1 to 3 and calcium silicide of Comparative Example 1.

X-ray diffraction of the MSix-containing calcium silicides of Examples 1 to 3 and the calcium silicide of Comparative Example 1 was measured with a powder X-ray diffraction instrument. FIG. 5 shows the obtained X-ray diffraction charts together with X-ray diffraction charts of $TiSi_2$ crystals and $CaSi_2$ crystals.

From the X-ray diffraction charts of the MSix-containing calcium silicides of Examples 1 to 3 and the calcium silicide of Comparative Example 1, presence of $CaSi_2$ crystals was confirmed. In addition, from the X-ray diffraction charts of the MSix-containing calcium silicides of Examples 1 to 3, presence of $TiSi_2$ crystals was confirmed.

Figure 6:
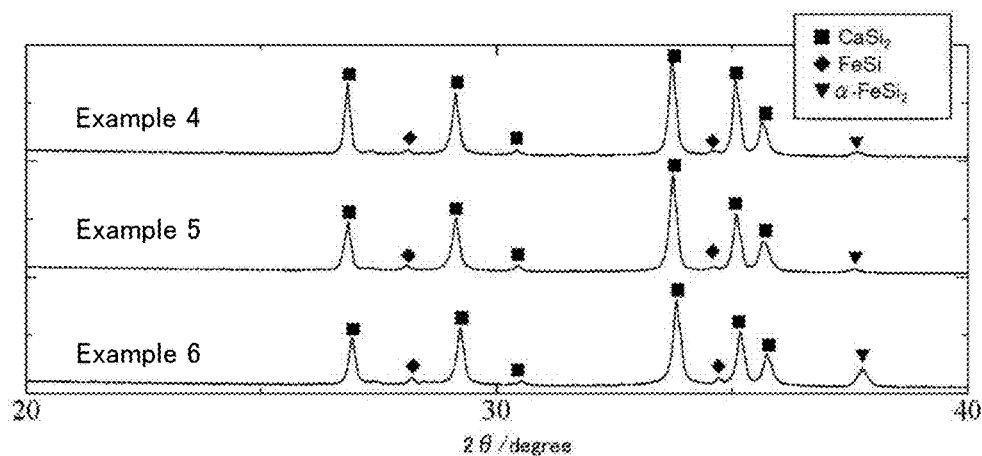
FIG. 6 shows X-ray diffraction charts of MSix-containing calcium silicides of Examples 4 to 6.

Similarly, the MSix-containing calcium silicides of Examples 4 to 6 were measured with the powder X-ray diffraction instrument. FIG. 6 shows the obtained X-ray diffraction charts. From the X-ray diffraction charts of the MSix-containing calcium silicides of Examples 4 to 6, presence of $CaSi_2$ crystals, FeSi crystals, and $FeSi_2$ crystals was confirmed.

Figure 7:
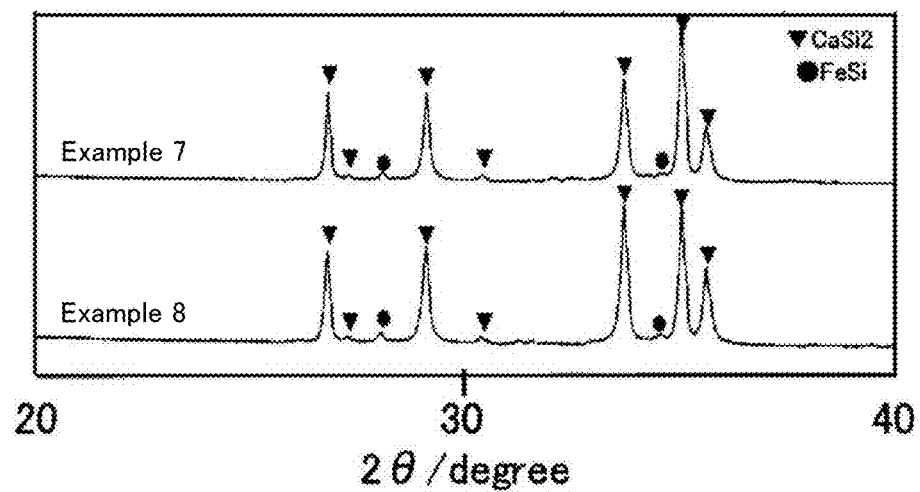
FIG. 7 shows X-ray diffraction charts of MSix-containing calcium silicides of Examples 7 and 8.

Similarly, the MSix-containing calcium silicides of Examples 7 and 8 were measured with the powder X-ray diffraction instrument. FIG. 7 shows the obtained X-ray diffraction charts. From the X-ray diffraction charts of the MSix-containing calcium silicides of Examples 7 and 8, presence of $CaSi_2$ crystals and FeSi crystals was confirmed.

Evaluation Example 3

Figure 8:
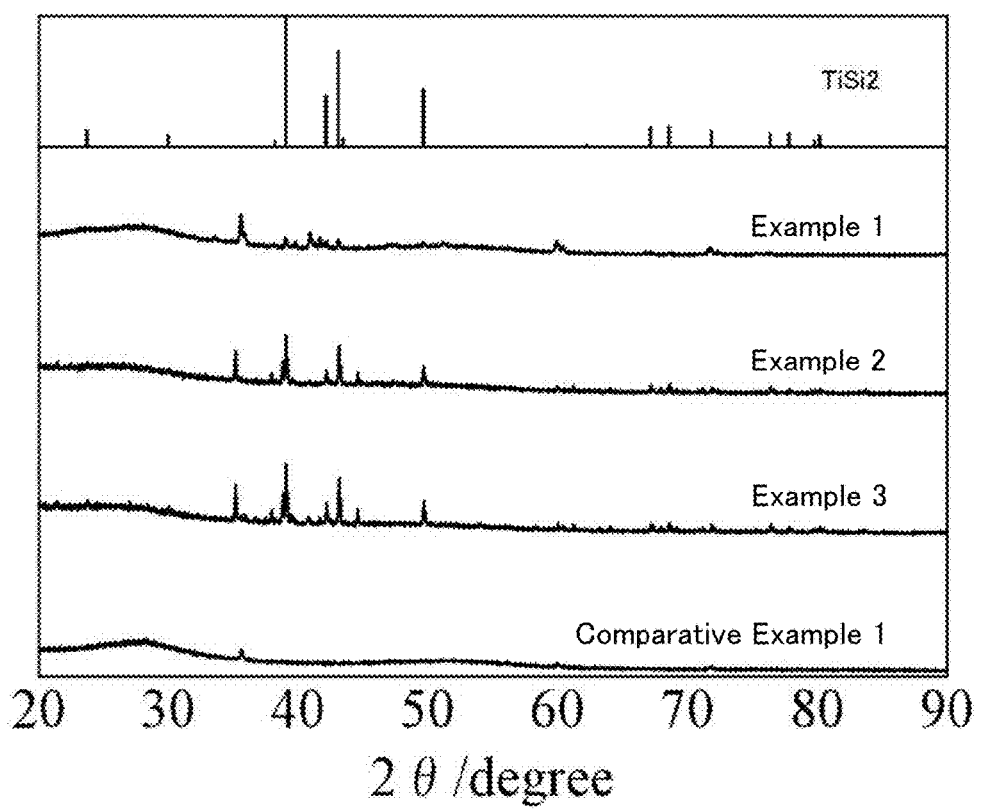
FIG. 8 shows X-ray diffraction charts of MSix-containing silicon materials of Examples 1 to 3 and a silicon material of Comparative Example 1.

X-ray diffraction of the MSix-containing silicon materials of Examples 1 to 3 and the silicon material of Comparative Example 1 was measured with a powder X-ray diffraction instrument. FIG. 8 shows the obtained X-ray diffraction charts together with an X-ray diffraction chart of $TiSi_2$ crystals.

The peaks that are not present in the X-ray diffraction chart of the silicon material of Comparative Example 1 but are present in the X-ray diffraction chart of the MSix-containing silicon material of Example 1 were confirmed to be the peaks of $TiSi_2$ crystals. The peaks that are common to the X-ray diffraction chart of the MSix-containing silicon material of Example 1 and the X-ray diffraction chart of the silicon material of Comparative Example 1 are inferred to be derived from a layered polysilane.

Figure 9:
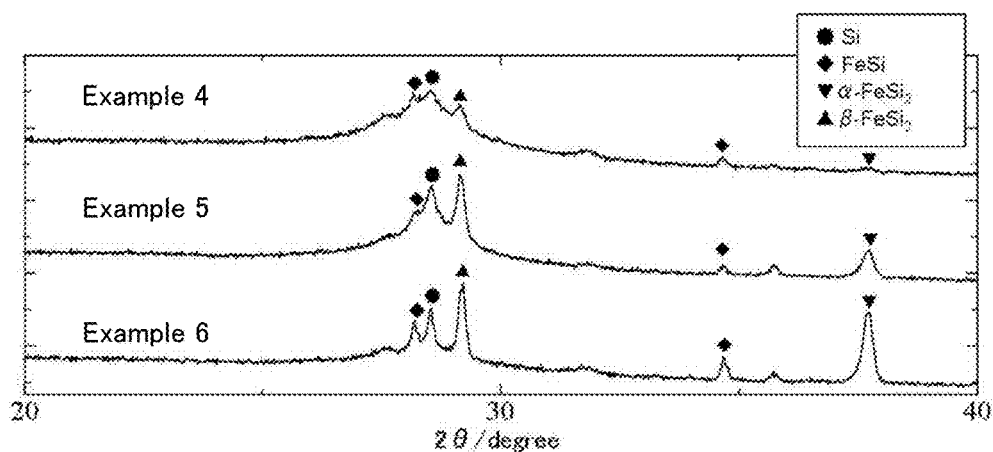
FIG. 9 shows X-ray diffraction charts of MSix-containing silicon materials of Examples 4 to 6.

Similarly, X-ray diffraction of the MSix-containing silicon materials of Examples 4 to 6 was measured with the powder X-ray diffraction instrument. FIG. 9 shows the obtained X-ray diffraction charts. From FIG. 9, FeSi crystals and $FeSi_2$ crystals were confirmed to be present in the MSix-containing silicon materials of Examples 4 to 6. In addition, from FIG. 9, silicon crystallites having a nano-level size were confirmed to be present in the MSix-containing silicon materials of Examples 4 to 6.

Figure 10:
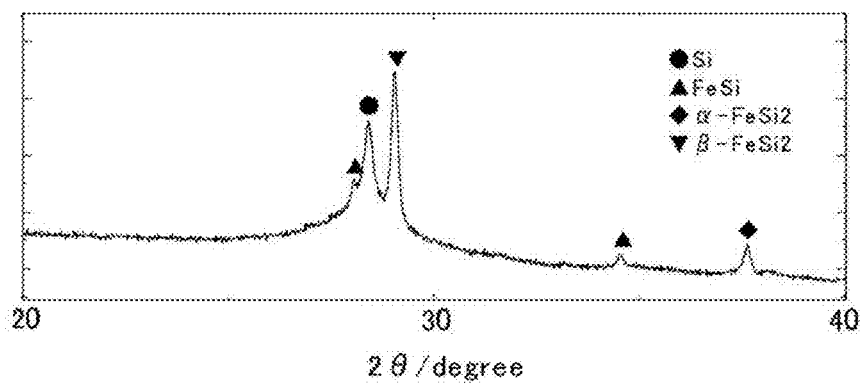
FIG. 10 shows an X-ray diffraction chart of an MSix-containing silicon material of Example 7.

Similarly, X-ray diffraction of the MSix-containing silicon material of Example 7 was measured with the powder X-ray diffraction instrument. FIG. 10 shows the obtained X-ray diffraction chart. From FIG. 10, FeSi crystals and $FeSi_2$ crystals were confirmed to be present in the MSix-containing silicon material of Example 7. In addition, from FIG. 10, silicon crystallites having a nano-level size were confirmed to be present in the MSix-containing silicon material of Example 7.

Evaluation Example 4

Composition analysis of the MSix-containing silicon materials of Examples 1 to 6 and the silicon material of Comparative Example 1 was performed by using an oxygen/nitrogen analyzer EMGA (Horiba, Ltd.) for oxygen, by using ion chromatography for chlorine, and by using inductively coupled plasma emission spectrometry for Ca, Ti, and Fe. Table 1 shows the results. The unit of each value in the table is mass %. Each value of Si was calculated by subtracting the percentages of the other elements from 100.

TABLE 1

|  | Si | Ca | Ti or Fe | Cl | O |
| --- | --- | --- | --- | --- | --- |
| Example 1 | 74.0 | 2.8 | 3.5 | 7.7 | 11.9 |
| Example 2 | 69.8 | 4.1 | 6.7 | 8.6 | 10.8 |
| Example 3 | 67.6 | 3.5 | 11.1 | 7.7 | 10.1 |
| Example 4 | 70.3 | 2.8 | 1.4 | 6.8 | 18.7 |
| Example 5 | 70.5 | 2.4 | 4.1 | 5.4 | 17.6 |
| Example 6 | 68.5 | 3.0 | 8.1 | 4.0 | 16.4 |
| Comparative Example 1 | 74.1 | 2.9 | — | 9.8 | 13.2 |

Evaluation Example 5

Figure 11:
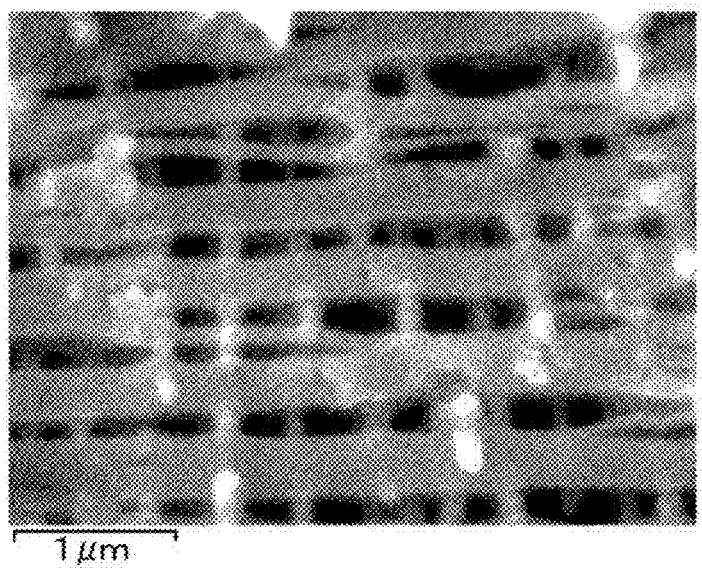
FIG. 11 is a scanning electron microscope image of the MSix-containing silicon material of Example 5.

The MSix-containing silicon material of Example 5 was observed with a SEM, and analysis was further performed on Fe and Si by EDX. FIG. 11 shows the obtained SEM image. From the results of the EDX analysis, in the SEM image in FIG. 11, Si was found to be present in both plate-like lateral laminated bodies and fiber bodies orthogonal to the laminated bodies. In addition, Fe was found to be present in the above fiber bodies.

Figure 12:
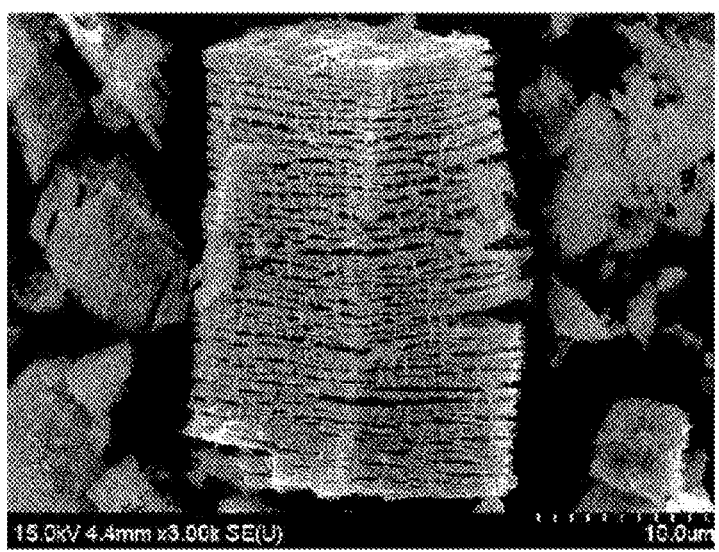
FIG. 12 is a scanning electron microscope image of the MSix-containing silicon material of Example 7.
Figure 13:
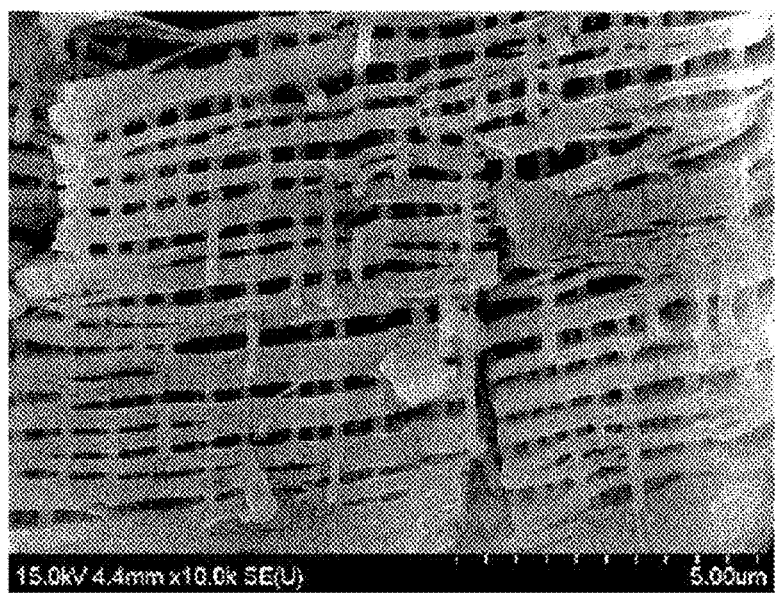
FIG. 13 is an enlarged scanning electron microscope image of FIG. 12.

The MSix-containing silicon material of Example 7 was observed with the SEM, and analysis was further performed on Fe and Si by EDX. FIG. 12 shows the obtained SEM image, and FIG. 13 shows an enlarged view of the SEM image. From the results of the EDX analysis, in the SEM images in FIGS. 12 and 13, Si was found to be present in both plate-like lateral laminated bodies and fiber bodies orthogonal to the laminated bodies. In addition, Fe was found to be present in the above fiber bodies.

Plate-like laminated bodies including Si and fiber bodies orthogonal to the laminated bodies and including FeSi and/or $FeSi_2$ are considered to be present in the MSix-containing silicon materials of Examples 5 and 7.

Figure 14:
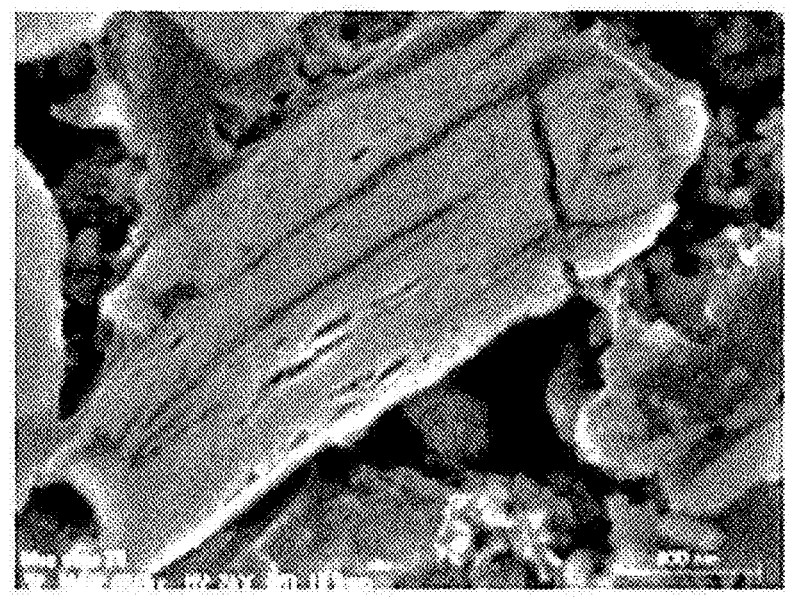
FIG. 14 is a scanning electron microscope image of an MSix-containing silicon material of Example 9.

The MSix-containing silicon material of Example 9 was observed with the SEM, and analysis was further performed on Fe and Si by EDX. FIG. 14 shows the obtained SEM image. From the results of the EDX analysis, in the SEM image in FIG. 14, Si was found to be present in the entireties of plate-like laminated bodies. In addition, Fe was found to be dispersedly present in a spotty manner in particles including the above laminated bodies.

Example A-1

A lithium ion secondary battery of Example A-1 was produced by using the MSix-containing silicon material of Example 1 as described below.

A slurry was prepared by mixing 45 parts by mass of the MSix-containing silicon material of Example 1 as a negative electrode active material, further 40 parts by mass of graphite as a negative electrode active material, 10 parts by mass of polyamide-imide as a binding agent, 5 parts by mass of acetylene black as a conductive additive, and an appropriate amount of N-methyl-2-pyrrolidone.

An electrolytic copper foil having a thickness of 20 μm was prepared as a current collector. The above slurry was applied on the surface of the copper foil in a film form by using a doctor blade. The copper foil on which the slurry had been applied was dried at 80° C. for 20 minutes to remove N-methyl-2-pyrrolidone through volatilization. As a result, a copper foil having a negative electrode active material layer formed on the surface thereof was obtained. The copper foil was pressed with a roll press machine such that the thickness of the negative electrode active material layer was 20 µm, to obtain a joined object. The joined object was heated and dried under reduced pressure at 200° C. for 2 hours to obtain an electrode of Example A-1. In the electrode of Example A-1, the negative electrode active material layer was confirmed to be disposed on the current collector in an amount of 2 mg/cm$^2$, and the density of the negative electrode active material layer was confirmed to be 1 g/cm$^3$.

The electrode of Example A-1 was cut to have a diameter of 11 mm, to obtain an evaluation electrode. A metal lithium foil was cut to have a diameter of 13 mm, to obtain a counter electrode. A glass filter (the Hoechst Celanese Corp.) and celgard 2400 (Polypore International, LP), which is single-layer polypropylene, were prepared as separators. In addition, an electrolytic solution was prepared by dissolving LiPF$_6$ in 1 mol/L in a solvent obtained by mixing 50 parts by volume of ethylene carbonate and 50 parts by volume of diethyl carbonate. The two types of separators were interposed between the counter electrode and the evaluation electrode such that the counter electrode, the glass filter, celgard 2400, and the evaluation electrode were arranged in this order, to form an electrode assembly. The electrode assembly was housed in a coin type battery case CR2032 (Hohsen Corp.), and further an electrolytic solution was poured into the battery case, to obtain a coin type battery. This was used as the lithium ion secondary battery of Example A-1.

Example A-2

A lithium ion secondary battery of Example A-2 was produced by the same method as in Example A-1 except for using the MSix-containing silicon material of Example 2 instead of the MSix-containing silicon material of Example 1 as a negative electrode active material.

Example A-3

A lithium ion secondary battery of Example A-3 was produced by the same method as in Example A-1 except for using the MSix-containing silicon material of Example 3 instead of the MSix-containing silicon material of Example 1 as a negative electrode active material.

Example A-4

A lithium ion secondary battery of Example A-4 was produced by the same method as in Example A-1 except for using the MSix-containing silicon material of Example 4 instead of the MSix-containing silicon material of Example 1 as a negative electrode active material.

Example A-5

A lithium ion secondary battery of Example A-5 was produced by the same method as in Example A-1 except for using the MSix-containing silicon material of Example 5 instead of the MSix-containing silicon material of Example 1 as a negative electrode active material.

Example A-6

A lithium ion secondary battery of Example A-6 was produced by the same method as in Example A-1 except for using the MSix-containing silicon material of Example 6 instead of the MSix-containing silicon material of Example 1 as a negative electrode active material.

Comparative Example A-1

A lithium ion secondary battery of Comparative Example A-1 was produced by the same method as in Example A-1 except for using the silicon material of Comparative Example 1 instead of the MSix-containing silicon material of Example 1 as a negative electrode active material.

Evaluation Example 6

With respect to the lithium ion secondary batteries of Examples A-1 to A-6 and Comparative Example A-1, a charging/discharging cycle was performed for 50 cycles in which discharging was performed at 0.25 C rate until the voltage of the evaluation electrode with respect to the counter electrode reached 0.01 V, and charging was performed at 0.25 C rate until the voltage of the evaluation electrode with respect to the counter electrode reached 1 V. (charge capacity at 50th cycle/initial charge capacity)×100 was calculated as a capacity retention rate (%). Table 2 shows the results.

In Evaluation Example 6, having Li occlude in the evaluation electrode refers to discharging, and having Li release from the evaluation electrode refers to charging.

TABLE 2

|  | Capacity retention rate (%) |
| --- | --- |
| Example A-1 | 76.8 |
| Example A-2 | 78.2 |
| Example A-3 | 80.5 |
| Example A-4 | 73.1 |
| Example A-5 | 76.1 |
| Example A-6 | 81.0 |
| Comparative Example A-1 | 72.5 |

The capacity retention rates of the lithium ion secondary batteries of Examples A-1 to A-6 were better than the capacity retention rate of the lithium ion secondary battery of Comparative Example A-1. The reason of the results may be that the MSix of the MSix-containing silicon material used in each of the lithium ion secondary batteries of Examples A-1 to A-6 effectively blocked concentration of stress generated by expansion and contraction of silicon, thereby inhibiting breakdown of the negative electrode active material. The MSix-containing silicon material of the present invention was confirmed to be suitable.

Example A-7

A carbon-coated MSix-containing silicon material of Example 7 was produced by grinding the MSix-containing silicon material of Example 7, coating the MSix-containing silicon material with carbon, and then rinsing the MSix-containing silicon material with water.

A slurry was prepared by mixing 75 parts by mass of the carbon-coated MSix-containing silicon material of Example 7 as a negative electrode active material, further 10 parts by mass of graphite as a negative electrode active material, 10 parts by mass of polyamide-imide as a binding agent, 5 parts by mass of acetylene black as a conductive additive, and an appropriate amount of N-methyl-2-pyrrolidone.

An electrolytic copper foil having a thickness of 20 μm was prepared as a current collector. The above slurry was applied on the surface of the copper foil in a film form by using a doctor blade. The copper foil on which the slurry has been applied was dried at 80° C. for 20 minutes to remove N-methyl-2-pyrrolidone through volatilization. As a result, a copper foil having a negative electrode active material layer formed on the surface thereof was obtained. The copper foil was pressed with a roll press machine such that the thickness of the negative electrode active material layer was 20 μm, to obtain a joined object. The joined object was heated and dried under reduced pressure at 200° C. for 2 hours to obtain an electrode.

The above electrode was cut to have a diameter of 11 mm, to obtain an evaluation electrode. A metal lithium foil was cut to have a diameter of 13 mm, to obtain a counter electrode. A glass filter (the Hoechst Celanese Corp.) and celgard 2400 (Polypore International, LP), which is single-layer polypropylene, were prepared as separators. In addition, an electrolytic solution was prepared by dissolving $LiPF_6$ in 1 mol/L in a solvent obtained by mixing 50 parts by volume of ethylene carbonate and 50 parts by volume of diethyl carbonate. The two types of separators were interposed between the counter electrode and the evaluation electrode such that the counter electrode, the glass filter, celgard 2400, and the evaluation electrode were arranged in this order, to form an electrode assembly. The electrode assembly was housed in a coin type battery case CR2032 (Hohsen Corp.), and further an electrolytic solution was poured into the battery case, to obtain a coin type battery. This was used as the lithium ion secondary battery of Example A-7.

Evaluation Example 7

Figure 15:
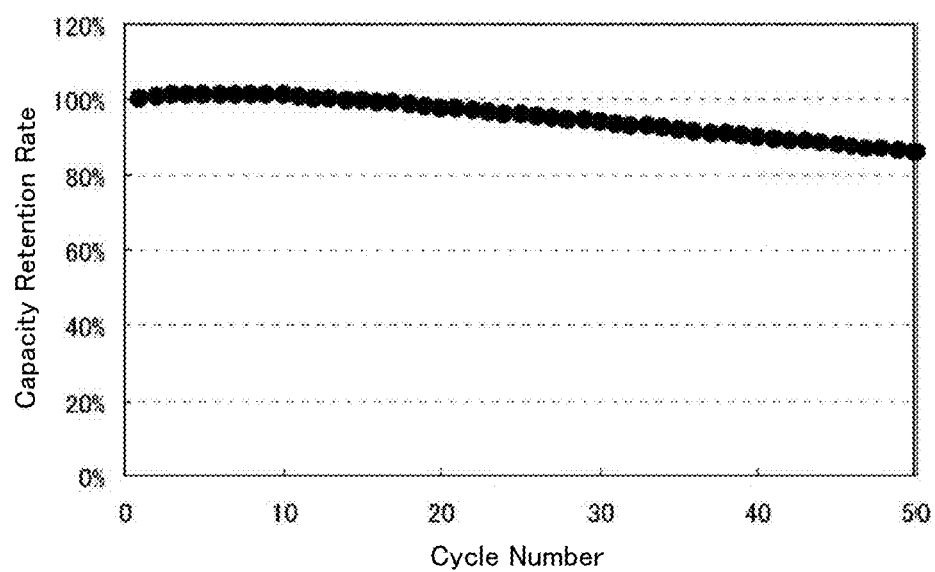
FIG. 15 is a graph of a relationship between cycle number and capacity retention rate in Evaluation Example 7.

With respect to the lithium ion secondary battery of Example A-7, a charging/discharging cycle was performed for 50 cycles in which discharging was performed at 0.25 C rate until the voltage of the evaluation electrode with respect to the counter electrode reached 0.01 V, and charging was performed at 0.25 C rate until the voltage of the evaluation electrode with respect to the counter electrode reached 1 V. The ratio of the charge capacity at each cycle with respect to the initial charge capacity was defined as a capacity retention rate. FIG. 15 shows a graph of a relationship between cycle number and capacity retention rate. In Evaluation Example 7, having Li occlude in the evaluation electrode refers to discharging, and having Li release from the evaluation electrode refers to charging.

From FIG. 15, the lithium ion secondary battery of Example A-7 is found to suitably maintain the capacity thereof.

The invention claimed is:

1. A method for producing an MSix-containing silicon material containing MSix in a silicon matrix, the method comprising:
a molten metal step of heating Ca, M (M is at least one element selected from the group 3 to 9 elements), and Si to form a molten metal;
a step of cooling the molten metal to obtain an MSix-containing calcium silicide containing MSix ($1/3 \leq x \leq 3$) in a calcium silicide matrix;
a step of reacting the MSix-containing calcium silicide with an acid to obtain an MSix-containing polysilane containing the MSix in a polysilane matrix; and
a heating step of heating the MSix-containing polysilane at 300° C. or higher.

2. A method for producing an MSix-containing silicon material containing MSix in a silicon matrix, the method comprising:
a melting step of heating and melting $CaSi_2$ containing M (M is at least one element selected from the group 3 to 9 elements);
a step of adding Ca to the molten $CaSi_2$ to obtain a molten metal;
a step of cooling the molten metal to obtain an MSix-containing calcium silicide containing MSix ($1/3 \leq x \leq 3$) in a calcium silicide matrix;
a step of reacting the MSix-containing calcium silicide with an acid to obtain an MSix-containing polysilane containing the MSix in a polysilane matrix; and
a heating step of heating the MSix-containing polysilane at 300° C. or higher.

3. A method for producing an MSix-containing silicon material containing MSix in a silicon matrix, the method comprising:
a step of cooling a molten metal containing Ca, M (M is at least one element selected from the group 3 to 9 elements), and Si to obtain an MSix-containing calcium silicide containing MSix ($1/3 \leq x \leq 3$) in a calcium silicide matrix;
a step of reacting the MSix-containing calcium silicide with an acid to obtain an MSix-containing polysilane containing the MSix in a polysilane matrix; and
a heating step of heating the MSix-containing polysilane at 300° C. or higher.

4. The method for producing the MSix-containing silicon material according to claim 1, wherein the MSix is FeSi and/or $FeSi_2$.

5. An MSix-containing silicon material containing MSix (M is at least one element selected from the group 3 to 9 elements, $1/3 \leq x \leq 3$) in a silicon matrix, the MSix-containing silicon material being articles each having a structure in which a plurality of plate-like silicon bodies are laminated in a thickness direction, wherein the MSix-containing silicon material contains a fiber body including the MSix.

6. The MSix-containing silicon material according to claim 5, wherein the fiber body is located over a plurality of layers in each of the particles.

7. An MSix-containing silicon material containing MSix (M is at least one element selected from the group 3 to 9 elements, $1/3 \leq x \leq 3$) in a silicon matrix, the MSix-containing silicon material being particles each having a structure in which a plurality of plate-like silicon bodies are laminated in a thickness direction, wherein the MSix is fibrous and located over a plurality of layers in each of the particles.

8. The MSix-containing silicon material according to claim 5, wherein the MSix is FeSi and/or $FeSi_2$, or $TiSi_2$.

9. A lithium ion secondary battery including the MSix-containing silicon material according to claim 5 as a negative electrode active material.

* * * * *

UNITED STATES PATENT AND TRADEMARK OFFICE
CERTIFICATE OF CORRECTION

PATENT NO. : 10,135,067 B2
APPLICATION NO. : 15/511746
DATED : November 20, 2018
INVENTOR(S) : Masanori Harata Page 1 of 1

It is certified that error appears in the above-identified patent and that said Letters Patent is hereby corrected as shown below:

In the Claims

Column 20, Line 41, Claim 5, delete "articles" insert --particles--.

Signed and Sealed this
Twelfth Day of February, 2019

Andrei Iancu
*Director of the United States Patent and Trademark Office*